United States Patent [19]
Oktay

[11] Patent Number: 6,084,575
[45] Date of Patent: Jul. 4, 2000

[54] PALMTRACK DEVICE FOR OPERATING COMPUTERS

[76] Inventor: Sevgin Oktay, 097 Fox Run, Poughkeepsie, N.Y. 12603

[21] Appl. No.: 09/055,494

[22] Filed: Apr. 6, 1998

[51] Int. Cl.$^7$ ........................................................ G09G 5/08
[52] U.S. Cl. ............................................. 345/167; 345/163
[58] Field of Search ..................................... 345/163, 164, 345/167, 157, 156; 341/22, 20

[56] References Cited

U.S. PATENT DOCUMENTS

| | | | |
|---|---|---|---|
| 5,237,311 | 8/1993 | Malley et al. | 345/167 |
| 5,648,798 | 7/1997 | Hamling | 437/43 |
| 5,818,357 | 10/1998 | Motoyama aet al. | 345/168 |
| 5,956,017 | 9/1999 | Ishizawa et al. | 345/901 |

*Primary Examiner*—Dennis-Doon Chow

[57] ABSTRACT

A computer device, hereafter called PalmTrack, is provided having an oblong shape following the general outline of a human hand further comprising a finger portion, palm portion and thumb portion. The finger portion accommodates three levers which are operated by pressing with fingers. The palm portion fits the palm of a right or a left hand comfortably and has a track-ball judiciously placed so as to fit the cup of the hand ergonomically. Thus, the cursor placement and highlighting of objects on a computer screen is accomplished by moving the palm of the hand over the track-ball without moving the device itself and without the use of the thumb, which usually suffers most from pain and dysfunction after repeated use. Further, PalmTrack is provided with slidable finger portion so that the over-all size of the PalmTrack can be adjusted, and varied at will in situ while in operation so as to provide a personal, ergonomically suitable pointing device for computers. A material which is internally smooth can also be stretched over the track-ball while its soothingly rough rubber-like exterior provides additional aid for relaxing the hand. The cover also provides a reliable operation and longevity by protecting the electronic components inside the device from environmental contamination such as dirt and dust.

12 Claims, 4 Drawing Sheets

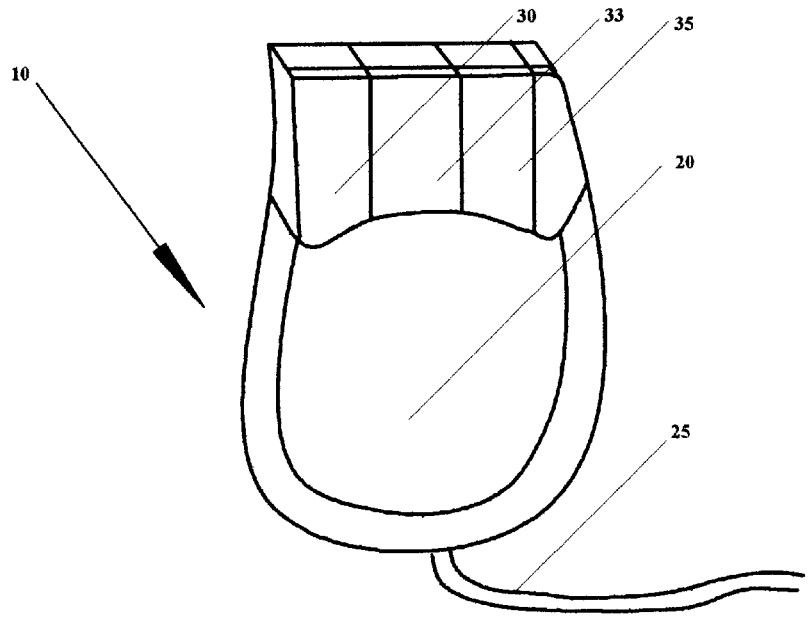
FIG. 1 - Prior Art
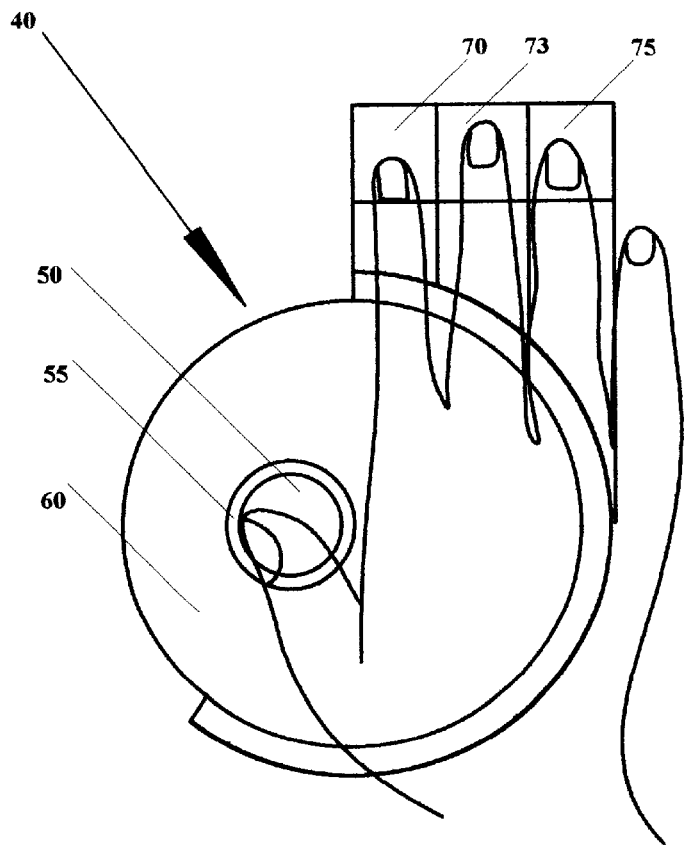
FIG. 2 - Prior Art

PALMTRACK DEVICE FOR OPERATING COMPUTERS

BACKGROUND OF THE INVENTION (1) Field of the Invention

The present invention relates to computer mouse devices in general, and to a primarily palm operated mouse device in particular.

(2) Description of the Related Art

Almost all application programs written for computers today utilize the so called mouse devices in order to point and/or select objects on computer screens. As is well known in the art, this is accomplished by moving a cursor on the screen, positioning it on the desired place or object, and pressing or clicking a lever on the mouse device to select or highlight the object.

In the present state of the art of computer mouse technology used in pointing to and selecting objects on computer screens, both the "placement" and the "selection" of the object and then the "clicking" onto the object is accomplished by pressing or rolling finger actuated levers or balls. By selecting, it is meant that the cursor, which is electronically connected to the computer through the mouse device, as is well known in the art, is moved to the desired object on the screen and an appropriate lever on the mouse is then pressed so as to highlight the selected object. The electrical connection between the mouse device and the computer can be via an electrical cord or cordless via radio magnetic coupling. An object may be, for example, a word or a picture on the computer screen. And, depending upon the particular mouse is used, the highlighting of the object with the mouse can be accomplished by pressing on an appropriate key or lever once or twice. The actual movement of the finger, or thumb with most mouse devices, until the object on the screen is selected can be very tiresome. If used for long periods of time involving days, weeks, and more, the fingers, especially the thumb can get not only sore and exhibit problems with metacarpal bones and the associated tendons, but actually become dysfunctional. Wrist ligament and wrist carpals can also exhibit pain and discomfort if proper care is not taken such as resting the fingers for extended periods of time, thus causing not to get work done, such as typing a manuscript, as needed, or falling behind in job responsibilities, etc.

In prior art, there are primarily two types of mouse devices that are in use. In an early type shown in FIG. 1, the device comprises a somewhat rectangular shaped base (10) having a hand rest (20) and keys (30), (33) and (35) which are finger actuated. Device (10) is first moved about on a flat surface such as a desk top with the palm of the hand until the cursor on the computer screen is positioned on the object to be selected. Then, one of the finger actuated keys is pressed by a finger to highlight the selected object. The key to be pressed is determined by the programming of the particular key for a particular function. Usually key (30) on the left is programmed to place the cursor at a particular location on the screen when pressed with the index finger. When key or lever (30) is pressed or "clicked" twice, the object where the cursor is placed is selected of highlighted. The middle key (33) sometimes takes the function of clicking twice so that rather than clicking lever (30) twice, middle lever (33) can be clicked once for the same function. Lever (35), which can be pressed with the finger next to the pinkie, usually is programmed to select a drop down menu on the computer screen. With this type of mouse device, an electrical cord (25) provides the connection to a computer (not shown).

In a second type of a mouse device, the selection of an object on the computer screen is accomplished not by moving the device itself but by rolling with the thumb, a ball or a track-ball, on a stationary base (60) shown in FIG. 2. FIG. 2 depicts a popular mouse device known as Trackman, reference numeral (40). The selecting function is accomplished by rotating a freely rolling track-ball (50) in its cage (55) with a thumb until the cursor is positioned onto a desired object to be selected ,and while there, any one of the levers (70), (73) or (75) can be pressed by index finger, middle finger or the finger next to the pinkie, depending upon how the levers have been assigned through programming. It is the repeated movement of the thumb in awkward and in unnatural contortions that cause the thumb to experience pain and discomfort. This is true with a even more recent mouse device described in U.S. Pat. No. 5,648,798 where Hamling discloses a universal ergonomic computer mouse/trackball, but thumb is still needed to operate the trackball. What is needed is a device that uses only those anatomical parts of the hand to operate a mouse device naturally, and without discomfort and injury, and leave other parts at their natural state without subjecting them to undue pain.

SUMMARY OF THE INVENTION

It is therefore an object of this invention to provide a computer device, referred to as PalmTrack hereafter, to easily locate and select objects on a computer screen by controlling the cursor through palm action.

It is another object of the present invention to provide a PalmTrack device to select objects on a computer screen without moving the device itself.

It is still another object of the present invention to provide a PalmTrack device that can locate and select objects on a computer screen without the use of the thumb of a hand.

It is yet another object of the present invention to provide a PalmTrack device that can locate and select objects on a computer screen by being operated by the cup of the palm of a hand only in its natural, restful state.

It is still another object of the present invention to provide a PalmTrack device which is also slidably adjustable to fit a hand, either right or left, for enhanced ergonomics and functionality.

These objects are accomplished by providing a PalmTrack computer device comprising an oblong base having the general outline of a human hand further comprising finger portion, palm portion, thumb portion; a housing body having a tip portion and a bottom portion fitted over said base, wherein said tip portion accepts the fingers of a hand, and bottom portion accepts the palm of a hand; said tip portion having a plurality of levers which control the actions of a cursor on a computer screen; said bottom portion having a centrally located aperture; a track-ball placed in said centrally located aperture; a means to hold said track-ball in said aperture; said track-ball fitting the palm of the human hand; said track-ball capable of being actuated by the palm of a hand; said track-ball controlling the motion of said cursor on said computer screen; and a means to connect said PalmTrack to said computer.

These objects are further accomplished by providing a sliding portion of the PalmTrack that can be adjusted to fit individual hands, and by providing a stretched soothing material over the track-ball so that the hand can be relaxed while operating the PalmTrack device.

BRIEF DESCRIPTION OF THE DRAWINGS

FIG. 1 shows a mouse device of prior art.

FIG. 2 shows a Trackman device of prior art.

DESCRIPTION OF THE PREFERRED EMBODIMENTS

Figure 3A:
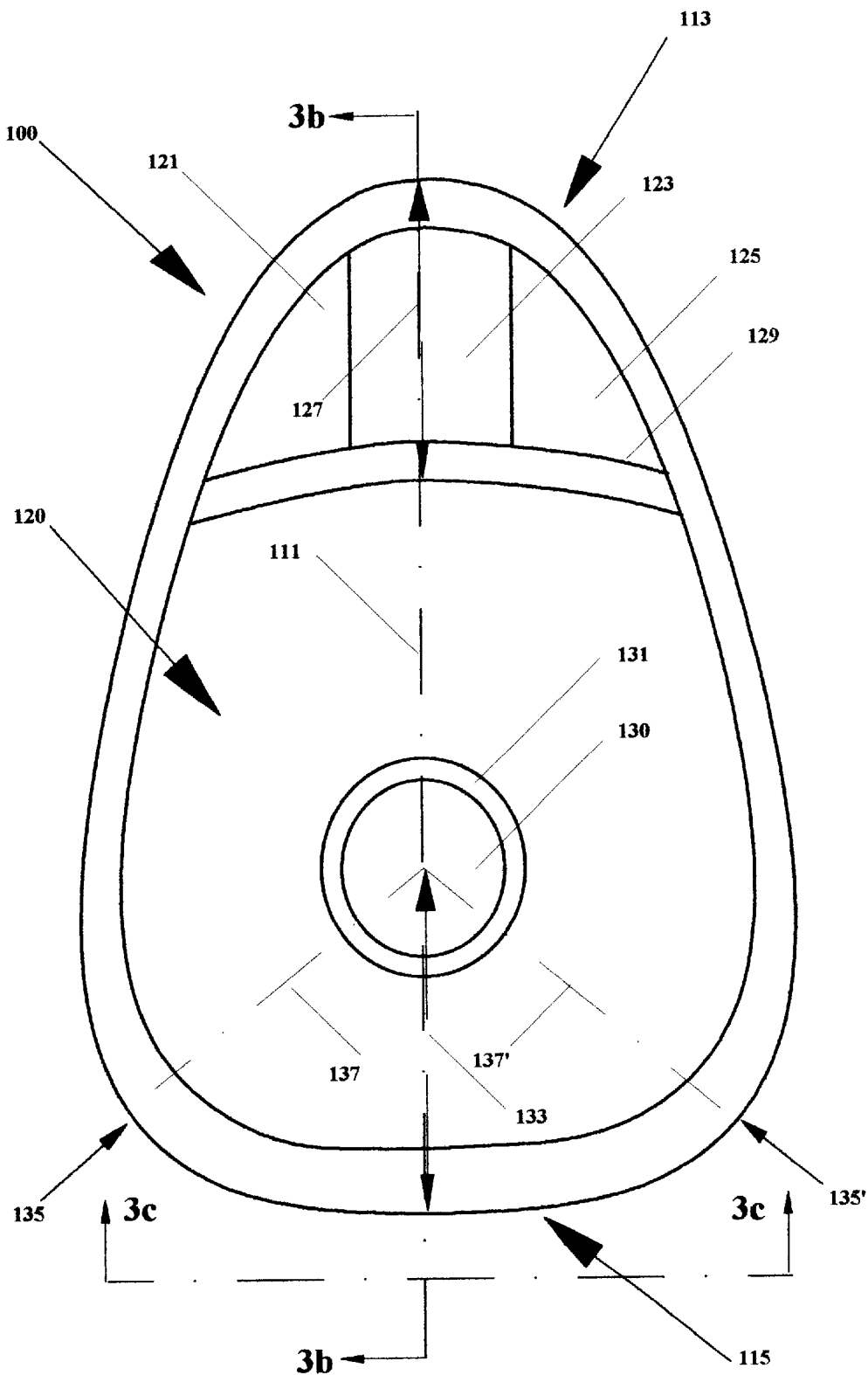
FIG. 3a shows a plan view of the PalmTrack device of this invention.
Figure 3B:
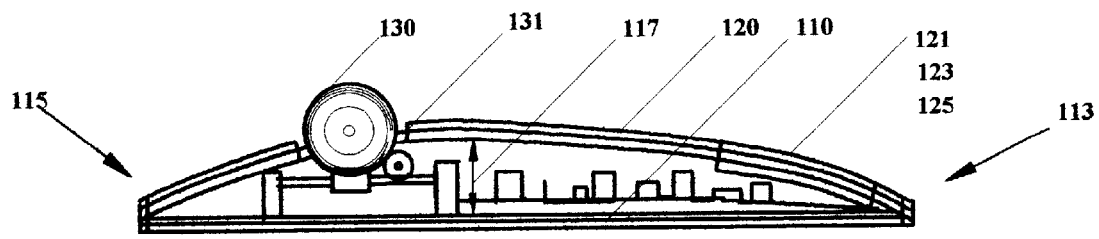
FIG. 3b shows a longitudinal cross-section of the PalmTrack device of FIG. 3a according to this invention.
Figure 3C:
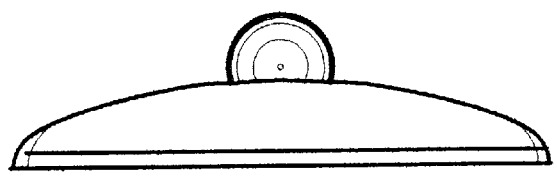
FIG. 3c shows a lateral cross-section of the PalmTrack device of FIG. 3a according to this invention.
Figure 4B:
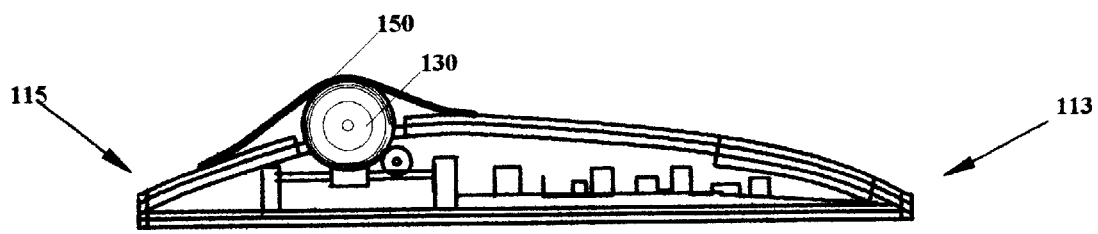
FIG. 4b shows the use of a stretchable material over the track-ball of the PalmTrack of this invention.
Figure 4A:
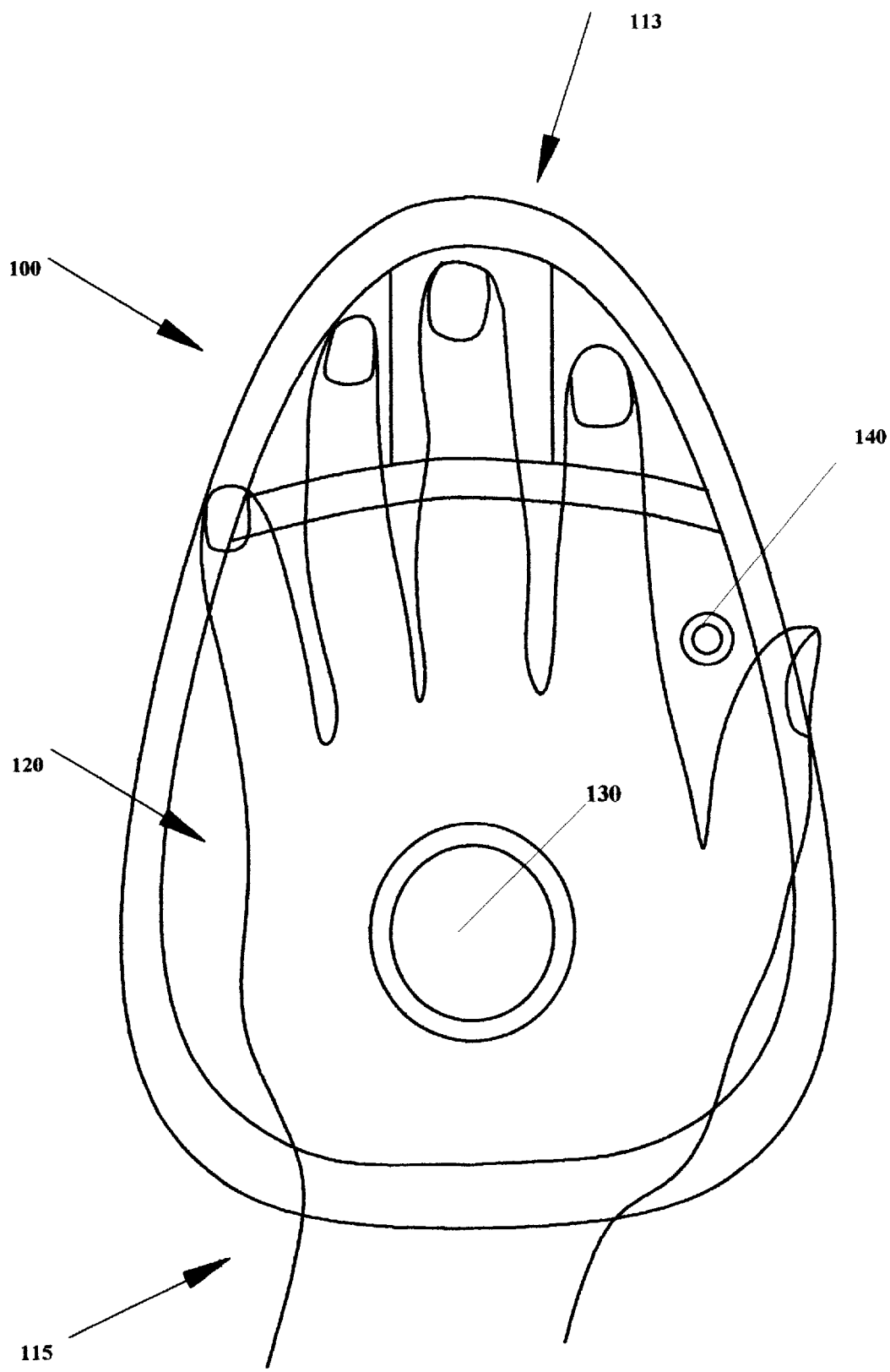
FIG. 4a shows the superposition of a human hand on the PalmTrack device of this invention, and the movably adjustable finger portion according to this invention.

Referring now the drawings, in particular to FIGS. 3a–3c and FIGS. 4a–4b, there is shown an electronic device, hereafter called PalmTrack, for locating and selecting objects on a computer screen. PalmTrack (100) is generally of oblong shape closely replicating the shape of an average human hand in its normal resting position on a flat surface. That is, PalmTrack has a base (110) which is narrower at the tip corresponding to the position of fingers on a hand and wider at the bottom, (115), corresponding to the "ball" of a normal hand. In general, the plan view of the PalmTrack is divided along the parts of a human hand as shown in FIG. 4a. Thus, PalmTrack can be thought of having regions comprising finger portion, palm portion, thumb portion, and other corresponding portions.

A housing body (120) is fitted over the base (110) as shown in FIG. 3a. The housing body has a tip portion (113) and a bottom portion (115), and has a camber that follows the contours of a hand that is slightly "cupped" on a surface such that the palm is slightly raised while the fingers and the ball of the hand rest on the surface. The housing includes a chamber with electronic components therein and it has a top with a camber (117), that is, an arch, preferably between about 20 to 25 millimeters (mm) high as shown in FIG. 3b. The tip portion of the housing is arranged to have three keys or levers (121), (123) and (125). The middle key (123) has an average length (127) between about 30 to 40 mm and the length of the other two keys on either side follow curve (129) to the side of housing (120). The keys have equal widths along the length of curve or arc (129) which is between about 75 to 85 mm.

The keys or levers can move up and down as they are pressed and released by fingers of a hand. The levers contact electronic circuit pads inside the housing to send signals to a computer (not shown) that is connected by means of an electrical cord, or cordlessly via electromagnetic coupling. Mechanical instruments and electronic circuitry controlling such actions are well known in the industry and they can be adapted to be used in the presently disclosed PalmTrack device very easily.

A main feature and key element of the presently disclosed invention is the placement of a track-ball, (130) in FIG. 3a, at a position corresponding to the cupped portion of the palm of a hand on housing (120). It is preferred that track-ball (130) is of spherical shape with a diameter between about 30 to 35 mm , and that it rests in an aperture formed at a distance (133) between about 50 to 60 mm from bottom edge (115). The track-ball is held rotatably in the aperture by means of a ring (131) that locks into a groove formed around the circumference of the aperture as seen in FIG. 3b. It is important that the track-ball is placed such that the hand rests comfortably and normally on the track-ball and that the hand can freely rotate the track-ball with the cup of its palm.

Thus, in general, the overall longitudinal length (111) of the disclosed PalmTrack is between about 170 to 190 mm with the tip being formed of an arc (129) of radius (127) between about 40 to 50 mm and the bottom sides being formed of arcs (135) of the same radii (137) between about 50 to 60 mm, both centered on the longitudinal center line (111) as shown in FIG. 3a. The remaining sides of the PalmTrack can be completed by drawing tangent lines to the arcs. However, it will be appreciated that the general shape and dimensions of the PalmTrack can be modified without departing from the spirit of the invention. Thus, in FIG. 3a, the tangent straight lines have been rounded to provide both better form and function.

In order to further provide the flexibility of being able to adjust the dimensions of PalmTrack for each personal use, a second embodiment is disclosed in FIG. 4a comprising an adjustable tip (113). Here, tip portion (113) of housing (110) is slidably engaged on base (110), wherein levers (121), (123) and (125) move together as an integral part of the tip. In this manner, the user can easily move the tip forward and back by pushing or pulling with his or her fingers to accommodate the length of his or her hand shown in the same Figure. Still another embodiment, though not shown, enables the housing slide sideways with a sliceable split along the longitudinal axis of the PalmTrack. In this embodiment, the portion of the housing that moves sideways will also move the track-ball with it. It will be understood that the mechanism that interfaces with the track-ball inside the housing would then have to be suspended from the underside of the housing.

Still another embodiment incorporates a material (150) that can be stretched over the track-ball as shown in FIG. 4b. It is preferred that the outside surface of material (150) is soothingly rough so that the user can use the PalmTrack to massage his or her hand while working at the computer. The outside surface could comprise long strands of rubber, but any other such pliable material can be used. Inside surface of material (150) must be smooth, however, so that the track-ball underneath can move freely as the movements of the hand are transmitted to it via the material. The added advantage of material (150) covering the track-balls to prevent dust and dirt particles from getting into the housing around the periphery of the ball. In this manner, one of the main reasons for breakdown of mouse devices in general is eliminated.

A further embodiment incorporates other buttons that can be used intermittently and not in a repeated manner by the thumb and the pinkie or little finger. Small button (140) shown in FIG. 4b can be programmed to switch between key macros as needed. A second similar switch-ball (not shown) can also be incorporated for the little finger to perform other tasks such as checking e-mail, or picking up a telephone installed onto the computer. It is preferred that the switch-balls have a diameter between about 10 to 15 mm.

Though numerous details of the disclosed device are set forth here, such as dimensions and materials, to provide an understanding of the present invention, it will be obvious, however, to those skilled in the art that these specific details need not be employed to practice the present invention. At the same time, it will be evident that the same or similar devices may be employed for other applications such as for foot operated machines.

That is, while the invention has been particularly shown and described with reference to the preferred embodiments thereof, it will be understood by those skilled in the art that various changes in form and details may be made without departing from the spirit and scope of the invention.

What is claimed is:

1. A PalmTrack computer device comprising:
   an oblong base having the general outline of a human hand further comprising finger portion, palm portion, thumb portion;
   a housing body having a tip portion and a bottom portion fitted over said base, wherein said tip portion accepts the fingers of a hand, and bottom portion accepts the palm of a hand;
   said tip portion slidably connected to said housing body;
   said tip portion having a plurality of levers which control the actions of a cursor on a computer screen;
   said bottom portion having a centrally located aperture;
   a track-ball placed in said centrally located aperture;
   means to hold said track-ball in said aperture;
   said track-ball fitting the palm of the human hand;
   a flexible material covering said track-ball;
   said track-ball capable of being actuated by the palm of a hand;
   said track-ball controlling the motion of said cursor on said computer screen;
   a switch-ball placed laterally in a second aperture formed near the thumb portion of said PalmTrack device; and
   a means to connect said PalmTrack to said computer.

2. A PalmTrack device of claim 1, wherein said tip portion slidably connected to said housing body has at least three said plurality of levers.

3. A PalmTrack device of claim 1, wherein said housing comprises an interior chamber including electronic components.

4. A PalmTrack device of claim 3, wherein said chamber has a camber between about 20 to 25 millimeters (mm).

5. A PalmTrack of claim 1, wherein said track-ball has a diameter between about 30 to 35 mm.

6. A PalmTrack of claim 1, wherein said means to hold said track-ball in said aperture is accomplished with a ring that locks into position in a groove circumscribing said aperture.

7. A PalmTrack device of claim 1, wherein said flexible material covering said track-ball has a soothingly rough outer surface and a smooth interior surface.

8. A PalmTrack device of claim 7, wherein said flexible material is stretched over said track-ball.

9. A PalmTrack device of claim 1, wherein said switch-ball has a diameter between about 10 to 15 mm.

10. A PalmTrack device of claim 7, wherein said switch-ball is held in said second aperture by means of a ring that locks into position in a groove circumscribing said second aperture.

11. A PalmTrack of claim 1, wherein said means to connect said PalmTrack to said computer is an electrical cord.

12. A PalmTrack of claim 1, wherein said means to connect said PalmTrack to said computer is through electromagnetic coupling.

* * * * *